US012760209B2

(12) United States Patent
Nowak et al.

(10) Patent No.: US 12,760,209 B2
(45) Date of Patent: Oct. 13, 2026

(54) SANDWICH STRUCTURES INCLUDING HYBRID ADHESIVES AND METHODS THEREOF

(71) Applicant: The Boeing Company, Arlington, VA (US)

(72) Inventors: Andrew Paul Nowak, Winnetka, CA (US); Michael Jared Ventuleth, Camarillo, CA (US); Ashley Marie Dustin, Santa Monica, CA (US); Phuong Bui, Thousand Oaks, CA (US); Ashley C. Tracey, Seattle, WA (US); Kay Youngdahl Blohowiak, Issaquah, WA (US); Derek Borjun Huang, Seattle, WA (US); William Bruce Hopkins Grace, Vashon, WA (US); Mohamed Azdamou, Seattle, WA (US); Zachary Cole Hern, Los Angeles, CA (US)

(73) Assignee: THE BOEING COMPANY, Arlington, VA (US)

( * ) Notice: Subject to any disclaimer, the term of this patent is extended or adjusted under 35 U.S.C. 154(b) by 55 days.

(21) Appl. No.: 18/793,471

(22) Filed: Aug. 2, 2024

(65) Prior Publication Data

US 2026/0035602 A1 Feb. 5, 2026

(51) Int. Cl.

| | |
|---|---|
| ***B32B 3/12*** | (2006.01) |
| ***B32B 7/12*** | (2006.01) |
| ***B32B 15/04*** | (2006.01) |
| ***B32B 15/08*** | (2006.01) |
| ***B32B 15/18*** | (2006.01) |
| ***B32B 15/20*** | (2006.01) |
| ***B32B 27/08*** | (2006.01) |
| ***B64C 7/02*** | (2006.01) |
| ***C08G 59/32*** | (2006.01) |
| ***C08G 59/50*** | (2006.01) |
| ***C09J 163/00*** | (2006.01) |

(52) U.S. Cl.

CPC ............... *C09J 163/00* (2013.01); *B32B 3/12* (2013.01); *B32B 7/12* (2013.01); *B32B 15/043* (2013.01); *B32B 15/08* (2013.01); *B32B 15/18* (2013.01); *B32B 15/20* (2013.01); *B32B 27/08* (2013.01); *B64C 7/02* (2013.01); *C08G 59/3227* (2013.01); *C08G 59/504* (2013.01); *B32B 2250/40* (2013.01); *B32B 2307/202* (2013.01); *B32B 2605/18* (2013.01)

(58) Field of Classification Search

USPC ........................................................... 528/362

See application file for complete search history.

(56) References Cited

U.S. PATENT DOCUMENTS

| | | | | | |
|---|---|---|---|---|---|
| 3,301,814 | A | | 1/1967 | Orinda | |
| 3,708,385 | A | | 1/1973 | Immethun | |
| 4,619,986 | A | * | 10/1986 | Keller | C07C 255/00 528/99 |
| 4,879,352 | A | * | 11/1989 | Fulton | C08C 19/22 525/380 |
| 5,066,735 | A | * | 11/1991 | Walker | C08J 5/244 528/102 |
| 5,939,508 | A | | 8/1999 | Keller | |
| 2011/0274873 | A1 | | 11/2011 | Khan et al. | |

FOREIGN PATENT DOCUMENTS

| | | | | | |
|---|---|---|---|---|---|
| CN | 113201302 | A | * | 8/2021 | C09J 11/08 |
| CN | 117430917 | A | | 1/2024 | |
| CN | 118325285 | A | | 7/2024 | |

OTHER PUBLICATIONS

CN117430917A Machine Translation (Year: 2023).*

Dominguez et al., "Phthalonitrile-Epoxy Blends: Cure Behavior and Copolymer Properties," Wiley InterScience, Aug. 20, 2008, 2504-2515.

Guo et al., "Effects of self-promoted curing behaviors on properties of phthalonitrile/epoxy copolymer," High Performance Polymers, 24(7), 571-579.

Lv et al., "Insights into Phthalonitrile/Epoxy Blends Modification System from Non-competitive Cure System Based on Alicyclic Anhydride," Chinese Journal of Polymer Science, vol. 35, No. 12, (2017), 1561-1571.

Yang et al., "High performance phthalonitrile/phenolic epoxy (PNP/PEP) copolymers and their GFRP composites," IOP Conf. Series: Earth and Environmental Science 170 (2018) 042012.

Extended European Search Report for European Application No. 25180941.4 dated Dec. 9, 2025. 7 pages.

* cited by examiner

*Primary Examiner* — Terressa Boykin

(74) *Attorney, Agent, or Firm* — MH2 Technology Law Group LLP

(57) ABSTRACT

An adhesive formulation includes an epoxy-functional monomer or epoxy-functional polymer and an amino-phthalonitrile monomer or amino-phthalonitrile polymer. The adhesive formulation can include 4,4'-methylenebis(n,n-diglycidylaniline), bisphenol a diglycidyl ether, bisphenol f diglycidyl ether, n,n-diglycidyl-4-glycidyloxyaniline, 1,4-butanediol diglycidyl ether, trimethylolpropane triglycidyl ether, poly[(phenyl glycidyl ether)-co-dicyclo-pentadiene], or a combination thereof. The adhesive formulation may include a difunctional amine monomer, solvents, and one or more additives. A method of making an epoxy-phthalonitrile copolymer and a sandwich panel composition is disclosed. The sandwich panel can be a component of an aerospace structural application, such as a nacelle.

20 Claims, 3 Drawing Sheets

SANDWICH STRUCTURES INCLUDING HYBRID ADHESIVES AND METHODS THEREOF

TECHNICAL FIELD

The present teachings relate generally to phthalonitrile-epoxy hybrid adhesives and, more particularly, to composite sandwich structures including phthalonitrile-epoxy hybrid adhesives.

BACKGROUND

Current state of the art (SOA) adhesives for sandwich panels in aerospace applications include materials and composite materials formulated from a variety of different base chemistries, such as epoxies, bismaleimides, polyimides, and the like. In the application of sandwich panels, epoxies are commonly used for commercial aerospace applications. Epoxy adhesives are amenable to curing at lower temperature, at or equal to 350° F., which eases processing conditions and compatibility for other materials used in the sandwich panel.

Unfortunately, epoxies or epoxy-functional polymers, or materials made therefrom are limited in their thermo-oxidative stability (TOS). Materials with higher TOS usually require higher temperature processing conditions which requires replacement or modification of known epoxy or epoxy-functional polymers. It would be beneficial for sandwich panels and adhesives used therein to incorporate improvements upon the TOS of the standard commercial epoxy without sacrificing the general ease of processing through the incorporation of polymers or copolymers using more thermo-oxidatively stable chemistry, such as phthalonitrile chemistry. While phthalonitriles are inherently known for high temperature stability, they usually require cure profiles reaching temperatures above 500° F. and exceeding 3 hours.

Therefore, it is desirable to fabricate a class of hybrid materials through the development of a thermoset network of epoxy and phthalonitrile chemistries that can provide or produce composite panels having material properties between those of a standard epoxy and phthalonitrile adhesive.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An adhesive formulation is disclosed, including an epoxy-functional monomer or epoxy-functional polymer. The adhesive formulation also includes an amino-phthalonitrile monomer or amino-phthalonitrile polymer. The adhesive formulation also includes one or more additives. Implementations of the adhesive formulation include where the epoxy-functional monomer or epoxy-functional polymer may include two or more glycidyl functional groups. The epoxy-functional monomer or epoxy-functional polymer may include 4,4'-methylenebis(n,n-diglycidylaniline), bisphenol a diglycidyl ether, bisphenol f diglycidyl ether, n,n-diglycidyl-4-glycidyloxyaniline, 1,4-butanediol diglycidyl ether, trimethylolpropane triglycidyl ether, poly[(phenyl glycidyl ether)-co-dicyclo-pentadiene], or a combination thereof. The adhesive formulation may include a difunctional amine monomer. The amino-phthalonitrile monomer or amino-phthalonitrile polymer can contain a single phthalonitrile functional group. The amino-phthalonitrile monomer or amino-phthalonitrile polymer contains at least one primary amine functional group. The adhesive formulation may include a solvent may include dimethyl sulfoxide, n,n-dimethylformamide, 1-methyl-2-pyrrolidinone, 2-phenoxyethanol, acetone, 2-butanone, 2-pentanone, 4-methyl-2-pentanone, n-butyl acetate, toluene, xylene, benzene, or a combination thereof. The one or more additives are selected from a group may include of a filler, a dispersant, a rheology modifier, a catalyst, a cure promoter, a surfactant, a pigment, and any combination thereof.

A method of making an epoxy-phthalonitrile copolymer is disclosed. The method includes combining an epoxy-functional monomer and an amino-phthalonitrile functional monomer. The method also includes heating the epoxy-functional monomer and an amino-phthalonitrile functional monomer to a first melting temperature to form a solution, mixing the solution until it is homogenous, and heating the solution at a second temperature to cure the epoxy-phthalonitrile copolymer. Implementations of the method of making an epoxy-phthalonitrile copolymer can include where the second temperature is less than or equal to 350° F. and the second temperature is sustained for less than or equal to 5 hours.

A sandwich panel composition is disclosed, which includes a honeycomb core. The sandwich panel composition also includes a first facesheet panel affixed to a first outer edge of the honeycomb core, a second facesheet panel affixed to a second outer edge of the honeycomb core, and a first phthalonitrile-epoxy adhesive layer between the first facesheet panel and the first outer edge of the honeycomb core. The sandwich panel composition also includes a second phthalonitrile-epoxy adhesive layer between the second facesheet panel and the second outer edge of the honeycomb core. Implementations of the sandwich panel composition include where the first facesheet or the second facesheet can include a polymer matrix. The polymer matrix can include a material selected from the group may include of epoxy, polyaramid, phenolic, bismaleimide, polyimide, phthalonitrile, polyether ether ketone (PEEK), polyetherketoneketone (PEKK), polyester, and a combination thereof. The first facesheet or the second facesheet may include a metal or metal alloy, such as aluminum, titanium, stainless steel, or a combination thereof. The honeycomb core may include an electrically conductive material. The honeycomb core may include a metal, or a polymer matrix. The honeycomb core may include a material selected from the group of aluminum, titanium, stainless steel, aramid, polyaramid, and any combination thereof. The sandwich panel can be a component of an aerospace structural application. The sandwich panel can be a component of a nacelle.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1A:
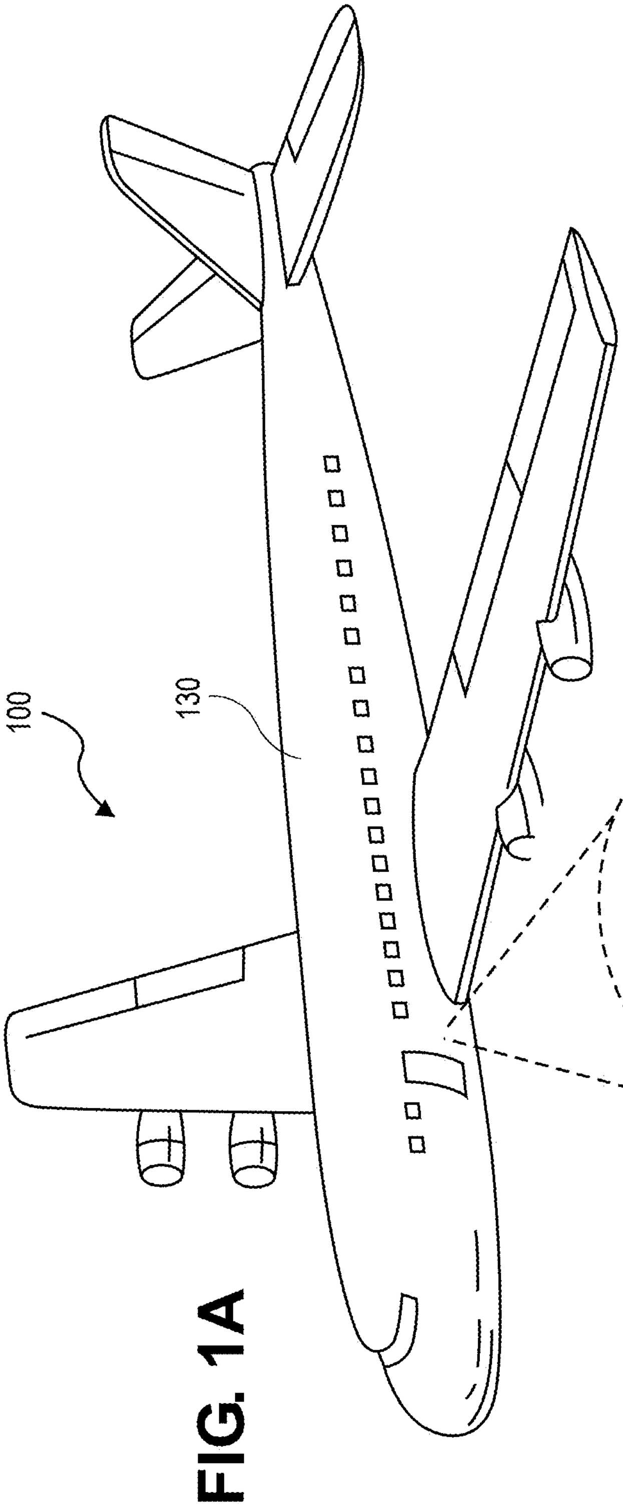
FIG. 1A depicts an application of a structural component including a sandwich panel having an adhesive composition within an aerospace vehicle.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure relates to a phthalonitrile-epoxy hybrid adhesive, sandwich structure and method of making. The aforementioned materials and processes include hybridizing an epoxy with high temperature stable phthalonitrile, and specifically, combining a standard epoxy resin and an amino-phthalonitrile monomer. Upon curing, the amine moiety covalently bonds to the epoxy while the phthalonitrile groups react with each other, creating a rigid co-polymerized thermoset network with superior properties, as compared to other materials. As a result, the provided film adhesives can be processable under current epoxy adhesive processing standards, for example, temperatures at or below 350° F., and cure times at or below 3 hours, while providing thermo-oxidative stability beyond that of known commercial epoxy materials. Process compatible phthalonitrile-epoxy hybrid adhesives and resulting sandwich structures of the present disclosure combine epoxy chemistry with high temperature stability phthalonitrile chemistry to create an adhesive formulation.

The provided adhesive improvements address a known issue where epoxy adhesives are limited in their thermo-oxidative stability (TOS). Materials with higher TOS usually require higher temperature processing conditions, which are not necessarily compatible with common, preferred commercial manufacturing processes or materials, such as epoxy or epoxy-functional materials. The materials and methods of the present disclosure provide improvements to the TOS of commercial epoxy without sacrificing the general ease of processing by combining epoxy materials with phthalonitrile chemistry. Phthalonitriles are known for high temperature stability, but usually require cure profiles reaching temperatures above 500° F. and exceeding times of 3 hours or more.

The presently disclosed method provides a method of making an epoxy-phthalonitrile copolymer via combining an epoxy monomer or polymer and an amino-phthalonitrile monomer, heating the components to a melting temperature, mixing the solution until it is homogenous, and heating the solution at an elevated cure temperature for a specified amount of time. The adhesive formulation contains an epoxy-containing monomer/polymer, an amino-phthalonitrile, optional solvents, and optional additives. The curing process can impact the properties of the final film adhesives by covalently bonding the amine moiety to the epoxy and reacting the phthalonitrile groups with each other to create a rigid co-polymerized thermoset network with superior properties compared to known material systems. The incorporation of phthalonitrile chemistry can improve the thermo-oxidative stability of the adhesive compared to standard epoxy materials by providing an adhesive material that has high temperature stability without requiring cure profiles reaching temperatures >500° F. and over 3 hours. While this hybrid adhesive can be used in other applications beyond sandwich structures and honeycomb panels, they can be particularly useful in higher temperature exposure applications.

Figure 1B:
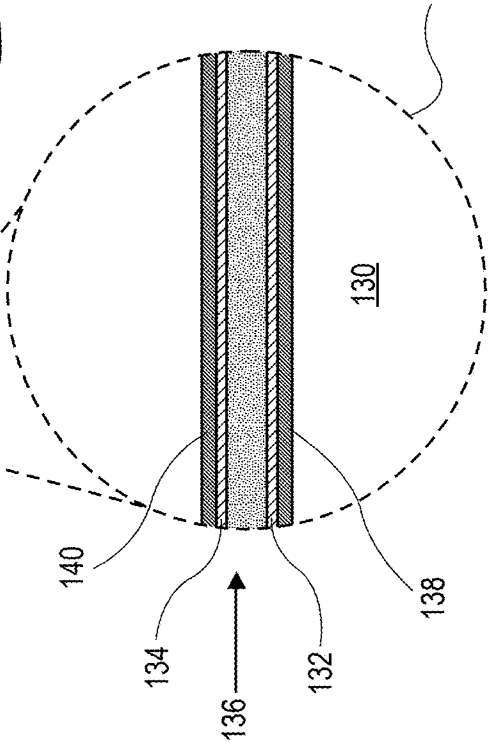
FIG. 1B is an exploded view of a portion of the aerospace vehicle of FIG. 1B, in accordance with the present disclosure.

FIG. 1A depicts an application of a structural component including a sandwich panel having an adhesive composition within an aerospace vehicle. FIG. 1B is an exploded view of a portion of the aerospace vehicle of FIG. 1B, in accordance with the present disclosure. An application of the presently disclosed coating composition or method is shown on an aerospace vehicle 100, whereby a vehicle component 130 can include the presently disclosed epoxy-phthalonitrile adhesive composition or a sandwich panel made therefrom. Exploded view FIG. 1B is shown, having vehicle component 130 showing an example sandwich type structure including a first composite material layer 138; a first epoxy-phthalonitrile adhesive layer 132, a core material layer 136, a second epoxy-phthalonitrile adhesive layer 134 and a second composite material layer 140. The multilayered material shown in FIG. 1B can be or include a structural component of or a portion of a vehicle. In one example the application of the presently disclosed coating composition is directed to an external surface of the aerospace vehicle 100, although other internal components or panel layers of an aerospace vehicle can include such a multilayered material panel or article. In examples, additional coating layers, such as paints, coatings, or other protective coatings can be applied upon an outward facing surface of the multilayered article, which could be either the first composite material layer 138 or the second composite material layer 140. It should be noted that one or more of the described layers can be optional in certain examples. Of further note is that FIG. 1B can be located towards an area of higher heat exposure in a typical aircraft or aerospace vehicle 100, or other high temperature exposure areas, such as near an engine, or near exhaust locations. Locations including auxiliary power units, nacelle locations, engine locations and other higher-temperature areas of an aircraft can also be applicable. There may further be specialized applications where such an epoxy-phthalonitrile adhesive layer composition as described in the present disclosure may be employed as a desirable alternative. In general, lightweight, high temperature exposed areas, or other high-temperature service parts in a vehicle may use such compositions, as well as hot air exposed portions of a vehicle or components thereof used for cooling or heating, such as, but not limited to ductwork used in the diversion of hot or high-temperature air or other fluids. Alternatively, ducting can be used to divert hot air or other fluids or as typically found in engine applications, thermal protection systems can be used to prevent the polymeric structures from excessive heat exposure.

Figures 2A, 2B:
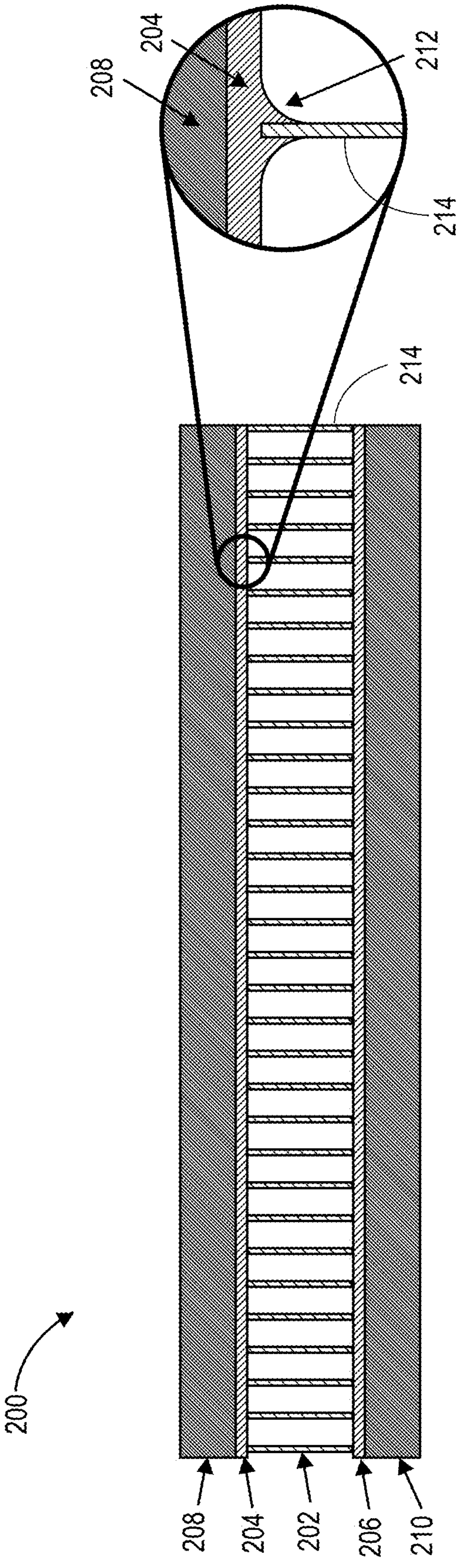
FIG. 2A is a cross-section of a composite sandwich material structure.
FIG. 2B is an inset showing an enlarged area thereof, in accordance with the present disclosure.

FIG. 2A is a cross-section of a composite sandwich material structure, in accordance with the present disclosure. A composite sandwich material structure 200 is shown, having a honeycomb core material layer 202, a first epoxy-phthalonitrile adhesive layer 204 adhered to a face or surface of the honeycomb core material layer 202, where a facesheet or first composite material layer 208 is adhered to the honeycomb core material layer 202. On an opposite side of the honeycomb core material layer 202, is adhered a second facesheet or composite material layer 210 with a second epoxy-phthalonitrile adhesive layer 206. Further shown in the inset of FIG. 2B is an enlarged area, highlighting a fillet 212 region formed between the first epoxy-phthalonitrile adhesive layer 204 or the second epoxy-phthalonitrile adhesive layer 206 and one or more surface of a wall 214 of the honeycomb core material layer 202. Fillets can provide additional surface area around the walls of the honeycomb core, providing extra bonding surface by climbing up the walls during processing and formation. Fillets are designed and incorporated into sandwich structures to improve adhesive strength of the system. However, their size must be carefully controlled in order to achieve this benefit. Flow rheology during the curing process of adhesive materials is critical to meet this demand. If the adhesive flows too much, it can be drawn away from the bondline between the honeycomb core and the facesheet, ultimately weakening the adhesion strength at that interface. Alternatively, if the adhesive does not flow enough, a proper fillet will not form and the adhesion benefit will not be achieved. In an example, the resulting composite sandwich material structure 200 is a honeycomb panel composed of two facesheet panels on the outer edge and a honeycomb core, with two cured phthalonitrile-epoxy adhesive layers used to secure the facesheet to the honeycomb core. The composite sandwich material structure using the adhesive can potentially be used with different types of honeycomb cores, such as metallic or polymeric ones. The use of the phthalonitrile chemistry in the adhesive layers can impact the processing conditions for this adhesive compared to standard epoxy materials by providing higher temperature stability without requiring cure profiles reaching temperatures >500° F. and exceeding 3 hours, as is typically required for phthalonitrile adhesives.

The honeycomb core material layer 202 can be or include fiber reinforced composite (e.g., fiberglass, carbon fiber, a poly-paraphenylene terephthalamide fabric such as Kevlar®, a meta-aramid fabric including meta-aramid fiber such as Nomex®, etc.) in a thermoset or thermoplastic matrix (e.g., phenolic, epoxy, polyester, etc.). The honeycomb core material layer 202 can also be or include any hard surface such as metal, paper, wood, plastic, etc. The honeycomb core material layer 202 has a thickness "T1" that extends from a first side 110 to a second side 112, wherein the thickness T1 of the honeycomb core material layer 202 can be from about 0.25 inches to about 2 inches, although other thinner or thicker dimensions are contemplated depending on the intended use and design of the panel. The honeycomb core material layer 202 includes a plurality of walls 214 that define a plurality of honeycomb cells, wherein the plurality of honeycomb cells extend through the thickness T1 of the honeycomb core material layer 202 from the first side to the second side. The honeycomb core material layer 202 can have a width "W" of from about 5 inches to about 120 inches and a length or height "H" of from about 5 inches to about 120 inches, although other widths and/or height dimensions are contemplated depending on the intended use and design of the acoustic panel. In examples, width or height can exceed 10 ft.

In examples, the process of manufacturing or fabricating the composite sandwich material structure 200 can include the use of specific solvents or additives that may enable processing of the formulation of this adhesive. In examples, the first or second adhesive layer can be processed up until a "B-stage" until the final processing of a composite sandwich material structure 200. B-staging is a process that utilizes heat, UV light, or other means to remove the majority of solvent from an adhesive or adhesive layer, thereby allowing a construction to be "staged. In examples, B-staging also involves the partial polymerization of a material, such as the adhesive or facesheet, before stopping the reaction, usually by reducing the temperature (i.e. freezing). It is used to improve handling properties, reduce cure times, control rheological properties, or a combination thereof. In still other examples, B-stage laminates can also be used, where the laminates are reinforced with woven glass fibers or other materials as described herein that can be used in prepregs. Applicable fabrics can alternatively include polyesters, nylons, in various forms such as woven, mat, knit, and the like.

Composite layers or structures of the present disclosure can include a substrate, one or more epoxy-phthalonitrile resin or layers thereof, and an additional composite material layer adhered to at least a portion of the substrate using the epoxy-phthalonitrile resin or layers thereof. In examples, the substrate comprises a metal or metal alloy, for example, aluminum, titanium, stainless steel, or alloys thereof. The substrate can be metallic or organic, wherein the substrate is flat and/or has a low radius of curvature and/or has a high radius of curvature, depending on the nature of the application or the aerospace component in which it is used.

In other examples, composite material layers can include glass fibers, carbon fibers, aramid fibers, alumina fibers, ceramic fibers, or a combination thereof. Examples of polymer materials that can be used (e.g., as a substrate) that undergo surface coating with a metallic coating or circuit layer in accordance with the present disclosure include polymer materials that act as a matrix in combination with one or more types of fibers or other reinforcing or functional additives. In one example, materials useful for the practice of the present disclosure include fiber-reinforced plastics (FRP) comprising a polymer material in combination with an inorganic fiber such as fibers of carbon, carbon nanotubes, graphite, fiberglass, glass, metals, metal alloys, or metalized fibers and metal coated glass fibers, alumina fiber or boron fiber. In one example, the fiber reinforced plastic can comprise organic fiber such as a nylon fiber, or aramid fiber. In one example, the fiber reinforced plastic can comprise organic fiber and/or inorganic fiber blended into a thermosetting polymer, such as an epoxy resin material. In one example, a portion of a multilayered composite laminate may be constructed of multiple layers of thermoset layers, fiber layers, or a mixture thereof.

In one example, a carbon fiber reinforced plastic (CFRP) or glass fiber reinforced plastic (GFRP) as the polymer article made therefrom is used as a material suitable for aircraft structures or the like. However, the present disclosure is not restricted to these types of materials or any particular arrangement, and articles formed from other polymers can also be used in the presently disclosed process of the present disclosure. In one example the polymer substrate comprises a semi-crystalline polymer. Semi-crystalline polymers provide the benefits of crystallinity, including thermal stability and chemical resistance, along with ductility and processing advantages to FRPs. In yet another example, the polymer substrate comprises an amorphous polymer. Amorphous polymers provide resiliency, ductility and processing advantages to FRPs.

In one example the polymer substrate is selected from epoxies, phenolics, polyesters, ureas, melamines, polyamides, polyimides, poly-ether-ether-ketones (PEEK), poly-ether-ketone-ketone (PEKK), polyetherimide (PEI), polyphthalamide, polyphthalates, polysulfone, polyurethanes, chlorinated polymers, fluorinated polymers, polytetrafluoroethylene, polycarbonates, liquid crystal polymers, partially crystalline aromatic polyesters, and modified versions or combinations thereof containing one or more fillers or reinforcement materials selected from carbon, carbon nanotubes, graphite, carbon fibers, graphite fibers, fiberglass, glass fibers, metals, metal alloys, metalized fibers and metal coated glass fibers.

In examples of the sandwich panel composition or structure, the sandwich panel composition includes a honeycomb core, a first facesheet panel affixed to a first outer edge of the honeycomb core, a second facesheet panel affixed to a second outer edge of the honeycomb core, a first phthalonitrile-epoxy adhesive layer between the first facesheet panel and the first outer edge of the honeycomb core, and a second phthalonitrile-epoxy adhesive layer between the second facesheet panel and the second outer edge of the honeycomb core. In some examples, the first facesheet or the second facesheet comprises a polymer matrix, which can include a material selected from the group consisting of epoxy, polyaramid, phenolic, bismaleimide, polyimide, phthalonitrile, polyether ether ketone (PEEK), polyetherketoneketone (PEKK), polyester, benzoxazine, and a combination thereof. In some examples, the first facesheet or the second facesheet can include a metal or metal alloy, such as, but not limited to aluminum, titanium, nickel, stainless steel, metal matrix composites, alloys or composites thereof or a combination thereof. In optional examples of the sandwich panel composition or structure, the honeycomb core can include an electrically conductive material, and can be a conductive metal, or a conductive polymer matrix. Alternatively, the sandwich panel composition can include a honeycomb core including aluminum, titanium, stainless steel, alloys thereof, aramid, polyaramid, and any combination thereof. As noted in regard to FIG. 1, the sandwich panel can be a component of an aerospace structural application and can be a component of a nacelle.

Exemplary sandwich panel compositions of the present disclosure can include two facesheet panels on the outer edge of a honeycomb core. Two cured phthalonitrile-epoxy adhesive layers can be used to secure the facesheets to the honeycomb core. In examples, the facesheet can include one or more layers of cured polymer matrix, in the green-state (B-staged). The facesheet can include peel-ply, and the polymer matrix can include epoxy, polyaramid, phenolic, bismaleimide, polyimide, phthalonitrile, polyether ether ketone (PEEK), polyetherketoneketone (PEKK), polyester, or any combination thereof. In alternate examples, the facesheet can be made of a metallic material, such as aluminum, titanium, stainless steel, or any combination or alloy thereof. In other exemplary sandwich panel compositions, the honeycomb core can either be conductive or non-conductive. The honeycomb core can alternately include a cured polymer matrix or a metallic material, including aluminum, titanium, stainless steel, or any combination or alloy thereof. Example polymeric honeycomb core materials can include Nomex™, Kevlar™, polyaramid, or any combination thereof. In some examples of the adhesive layer, the hybrid phthalonitrile-epoxy adhesive can be copolymerized into a thermoset network, wherein the cured adhesive exhibits a 5% degradation at a temperature exceeding 660° F. This would facilitate its use in aerospace applications, such as in the nacelle. The nacelle is the casing around the engines, but the application of such adhesive layers or structures made using the hybrid adhesive layers can be used in other high temperature exposure areas.

Within the aforementioned sandwich panel structure disclosed herein, the adhesive layer can be or include an epoxy-functional monomer or polymer, an amino-phthalonitrile monomer or polymer, and one or more additives. Illustrative epoxy-functional monomer or polymers can include epoxy-functional polymers or monomers including two or more glycidyl functional groups, such as, but not limited to 4,4'-methylenebis(N,N-diglycidylaniline), bisphenol A diglycidyl ether, bisphenol F diglycidyl ether, N,N-diglycidyl-4-glycidyloxyaniline, 1,4-butanediol diglycidyl ether, trimethylolpropane triglycidyl ether, poly[(phenyl glycidyl ether)-co-dicyclo-pentadiene], or combinations thereof. In examples, the epoxy-functional monomer or polymer can alternatively include one or more epoxy functional groups and one or more amine functional groups. Illustrative phthalonitrile monomers or polymers can include amino-phthalonitrile polymer including a single phthalonitrile functional group and at least one primary amine functional group, such as but not limited to 4-nitrophthalonitrile. In examples, a difunctional amine-functional monomer can be added, such as, but not limited to 4,4'-diaminodiphenyl sulfone, 3,3'-diaminodiphenyl sulfone, p-phenylene diamine, 4,4'-diaminobenzophenone. 1,3-cyclohexanebis(methylamine), or a combination thereof. In examples of forming or utilizing the copolymer adhesive formulation as mentioned herein, there may be the use of a solvent which can include dimethyl sulfoxide, N,N-dimethylformamide, 1-methyl-2-pyrrolidinone, 2-phenoxyethanol, acetone, 2-butanone, 2-pentanone, 4-methyl-2-pentanone, n-butyl acetate, toluene, xylene, benzene, or a combination thereof. Furthermore, there may be one or more additives incorporated into the formulation which is selected from a group consisting of a filler, a dispersant, a rheology modifier, a catalyst, a cure promoter, a surfactant, a pigment, and any combination thereof. In examples, illustrative fillers can include silica, fumed silica, polyether ether ketone (PEEK), polyetherketoneketone (PEKK), iron oxide, aluminum oxide, glass microspheres, or any combination thereof. Illustrative catalysts can include organic catalysts, metallic catalysts, or any combination thereof, including diiminoisoindoline, organic catalysts such as those that contain amine functionality, phenol functionality, or any combination thereof. Amine functional organic catalysts can further include m-BAPS, p-BAPS, melamine, or any combination thereof. Phenol-functional organic catalysts can include hydroxyquinone. Metallic catalysts can include copper-containing, iron-containing, zinc-containing, nickel-containing, palladium-containing, or any combination thereof, such as copper acetylacetonate, iron acetylacetonate, zinc acetylacetonate, nickel acetylacetonate, palladium acetylacetonate, or any combination thereof. Cure temperatures of the adhesive formulation include temperatures less than or equal to 350° F., and cured for less than or equal to 5 h, 4 h, 3 h, 2 h, or less than 4 h or 3 h. This hybrid adhesive can be used in existing processing, bonding cycles and curing cycle processes.

Figure 3:
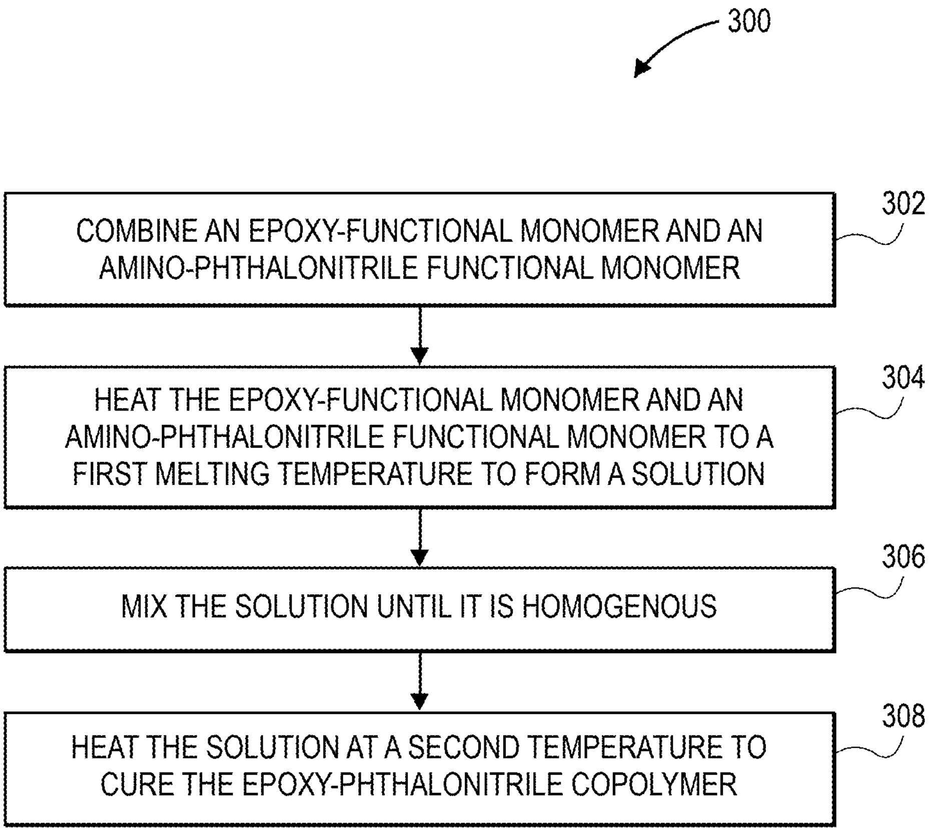
FIG. 3 is a flowchart illustrating a process for preparing an epoxy-phthalonitrile copolymer composition, in accordance with the present disclosure.

FIG. 3 is a flowchart illustrating a process for preparing an epoxy-phthalonitrile copolymer composition, in accordance with the present disclosure. A method of making an epoxy-phthalonitrile copolymer 300 includes the steps of combining an epoxy-functional monomer and an amino-phthalonitrile functional monomer 302, heating the epoxy-functional monomer and an amino-phthalonitrile functional monomer to a first melting temperature to form a solution 304, mixing the solution until it is homogenous 306, and heating the solution at a second temperature to cure the epoxy-phthalonitrile copolymer 308. In examples, the method of making an epoxy-phthalonitrile copolymer 300 can include wherein the second temperature is less than or equal to 350° F., and the second temperature is sustained for less than or equal to 5 hours. In examples, the specific compositions as mentioned herein can also be incorporated into the method of preparation. Further steps can also be included, such as mixing or homogenization with the use of an overhead mixer, a centrifugal mixer, hand-mixing, sonication, resonant acoustic mixing, and the like. In examples, the high temperature resistant properties of the present hybrid adhesive can be obtained while curing at lower temperatures. The hybrid materials are free of oxazoline bond formation, with the use of an amine-epoxy crosslink within the adhesive composition. It should be noted that the amino-phthalonitrile monomer or polymer contains only one phthalonitrile moiety.

EXAMPLES

Materials 4-aminophenol, 4-nitrophthalonitrile, and potassium carbonate were purchased from TCI America. Potassium hydroxide, 4,4'-methylenebis(N,N-diglycidylaniline) (TGDDM), and dimethylformamide (DMF) were purchased from Millipore Sigma. 4-Phenoxyaniline and 2,2-Bis(4-glycidyloxyphenyl) propane (BADGE) were purchased from TCI America. Aluminum substrates (phosphoric acid anodized and primed using Solvay BR 6747-1) were purchased from Pacific Coast Composites. Aerosil R812 was supplied by Evonik. Solvay FM309-1, Solvay Cycom 5320 prepreg, primed 425 slotted aluminum honeycomb core, and style 104 E-glass fabric were supplied by Boeing. All materials were used as received.

Example 1: Synthesis of 4-APN: An oven-dried, 4-L three-necked round bottom flask equipped with an overhead mixer, condenser, and nitrogen inlet was charged with 4-aminophenol (43.7 g, 0.40 mol, 1 equiv.) and ca. 1.5 L DMF. Under a flow of nitrogen, the solution was stirred at 300 rpm and heated to 40° C. using a heating mantle. Potassium carbonate (82.9 g, 0.60 mol, 1.5 equiv.) was added partwise over 30 min. Next, 4-nitrophthalonitrile (69.3 g, 0.40 mol, 1 equiv.) was added partwise over 15 min, at which point the solution turned deep brown in color. Heating was increased to 100° C. and the reaction allowed to stir for 5 h. The reaction mixture was removed from heating and allowed to cool to room temperature. After cooling, the dark brown mixture was poured into 10.0 L of a 0.1 M potassium hydroxide solution, filtered, and washed with a copious amount of water. The light brown product was dried in a vacuum oven overnight. Yield was 81.3 g (86%).

Example 2: Preparation of Phthalonitrile-Epoxy Adhesive: Equal parts (5.0 g) TGDDM and Example 1 were combined in an aluminum dish and heated to 110° C. on a hotplate. The mixture was manually mixed with a wooden spatula for 10 min or until the adhesive became a homogenous, dark brown liquid. The adhesive was then allowed to cool to room temperature as a light brown solid. For film adhesive preparation, the liquid adhesive was poured hot onto 1 mil scrim (4"×4") before cooling. The scrim used in this example was a style 104 E-glass fabric.

Example 3: Preparation of Phthalonitrile-Epoxy Adhesive with Filler: TGDDM (5.0 g) and fumed silica (0.2 g) were added to an aluminum dish and heated to 110° C. on a hotplate. The mixture was manually mixed with a wooden spatula for 15 min. Example 1 (5.0 g) was added directly to the aluminum dish and mixed for 10 min. The temperature was increased to 130° C. with continued mixing for another 10 min until the adhesive became a homogenous, dark brown liquid. The adhesive was then poured hot onto a 1 mil scrim (4"×4") before cooling.

Example 4: Sandwich Panel Preparation-Co-Cure Bonding: Cycom 5320 prepreg, Example 2 (adhesive), and primed 425 slotted aluminum honeycomb core were cut into roughly 2"×2" pieces. An aluminum backing plate was covered with a silicone rubber sheet (120 mil thick) followed by a piece of Kapton film (2 mil thick). The release layers were removed from one piece of the Cycom 5320 prepreg and it was placed onto the Kapton film. Example 2 was placed onto the prepreg. The honeycomb core was placed onto the adhesive with the slotted side towards the adhesive. A second piece of Example 2 was placed onto the top of the honeycomb core. The release layers were removed from another piece of Cycom 5320 prepreg and it was placed on top. Teflon shims were added alongside the sandwich panel and were slightly lower in height to help prevent core crushing. An aluminum caul plate was covered with a silicone rubber sheet (120 mil) followed by a piece of Kapton (2 mil) and placed on top with the Kapton in contact with the prepreg. A layer of breather fabric was added on top and the entire setup was sealed in a Kapton vacuum bag.

Example 5: Curing of Sandwich Panel: The sandwich panel layup (Example 4) was placed in an oven and vacuum was pulled to 20 in Hg. The oven was heated at 3° C./min up to 175° C., where it is held for 3 h. The heat was turned off and the oven was allowed to cool to room temperature. The vacuum was released, and the cured sandwich panel was removed from the vacuum bag.

Example 6: Preparation of Phthalonitrile-Epoxy Adhesive (2:1 Epoxy to Amine Functionality): 10.0 g of BADGE, 7.0 g of Example 1, and three 0.2" diameter glass beads were added to a mixer cup and centrifugally mixed for nine minutes at 2000 RPM. The resulting solution was poured into an aluminum weigh boat and heated on a hot plate set to 135° C. The solution was slowly stirred by hand until it appeared homogenous. The weigh boat was removed from the heat and the solution was allowed to cool to room temperature.

Comparative Example 1: FM309-1 Sandwich Panel: Cycom 5320 prepreg, FM309-1, and primed 425 slotted aluminum honeycomb core were cut into roughly 2"×2" pieces. An aluminum backing plate was covered with a silicone rubber sheet (120 mil thick) followed by a piece of Kapton film (2 mil thick). The release layers were removed from one piece of the Cycom 5320 prepreg and it was placed onto the Kapton film. The release layers were removed from a piece of FM309-1 and it was placed onto the prepreg. The honeycomb core was placed onto the adhesive with the slotted side towards the adhesive. The release layers were removed from a second piece of FM309-1 and the adhesive was placed onto the top of the honeycomb core. The release layers were removed from another piece of Cycom 5320 prepreg and it was placed on top. The sandwich panel was then taped in place on the aluminum plate using Kapton tape. An aluminum caul plate was covered with a silicone rubber sheet (120 mil) followed by a piece of Kapton (2 mil) and placed on top with the Kapton in contact with the prepreg. A layer of breather fabric was added on top and the entire setup was sealed in a Kapton vacuum bag. The entire setup was moved into an oven and vacuum was pulled to 23 in Hg. The oven was heated at 3° C./min up to 175° C., where it is held for 2 h. The heat was turned off and the oven was allowed to cool to room temperature. The vacuum was released, and the cured sandwich panel was removed from the vacuum bag.

Comparative Example 2: 4-Phenoxyaniline Adhesive (2:1 Epoxy to Amine Functionality): 10.0 g of BADGE, 5.5 g of 4-phenoxyaniline, and 0.2" diameter glass beads were added to a mixer cup and centrifugally mixed for nine minutes at 2000 RPM. The resulting solution was poured into an aluminum weigh boat and heated on a hot plate set to 135° C. The solution was slowly stirred by hand until it appeared homogenous. The weigh boat was removed from the heat and the solution was allowed to cool to room temperature.

Characterization

Rheology: Rheology of Example 2, Example 3, and an uncured film of FM309-1 (Comparative Example 1) was monitored during a basic cure profile using a TA DHR 20 Rheometer. Samples were evaluated via oscillatory rheology (1 Hz, 0.01% strain, 25 mm parallel plates) as they were heated from room temperature to 175° C. at 2° C./min followed by a temperature hold at 175° C. for 2 h.

A comparison of the complex viscosity curves of Example 2, Example 3, and Comparative Example 1 shows that all three adhesives follow a typical thermoset curing pattern: 1) Viscosity reduces as heat is applied, reaching a minimum value, 2) Once gelation begins, the viscosity rises quickly before ultimately reaching a plateau. It is significant that both Example 2 and Example 3 begin and reach gelation at a similar time point to Comparative Example 1. This implies that similar heating profiles may be used for Example 2 and Example 3 as that which is employed for a standard commercial adhesive (Comparative Example 1) currently used for honeycomb sandwich bonding.

Thermo-oxidative Stability (TOS): A sample (~1"×1") of Example 2 and Example 3 were added to individual aluminum weigh boats and cured according to the cure schedule listed in Example 5. A 1"×1" sample of FM309-1 was added to an aluminum weigh boat and cured according to the cure schedule listed in Comparative Example 1. Thermogravimetric analysis (TGA) was performed on these samples using a TA Instruments Discovery TGA 550. Testing was performed on ~18 mg of cured adhesive using a 10° C./min ramp rate from room temperature up to 950° C. in air. Degradation temperature ($T_{d,5\%}$, $T_{d,10\%}$) was measured as the temperature at which 5% or 10% of the initial sample weight was lost. Tabulated results are visible in Table 1, below.

TABLE 1

Degradation temperatures of cured adhesives

| Sample | $T_{d,\ 5\%}$ (° C.) | $T_{d,\ 10\%}$ (° C.) |
|---|---|---|
| Example 2 | 355 | 377 |
| Example 3 | 352 | 381 |
| Comparative Example 1 | 351 | 369 |

Both Example 2 and Example 3 demonstrate slightly higher degradation temperatures than the standard commercial epoxy at 5% weight loss. Without being bound by any particular theory, it is understood that the initial degradation mechanism remains the same between all three adhesives and is attributed to the epoxy functionality, which represents the weakest thermo-oxidatively stable linkage. However, both of the hybrid phthalonitrile-epoxy adhesives experience a much slower degradation curve after initiation, reflected in the $T_{d,10\%}$ value. This is attributed to the reinforcement provided by the phthalonitrile network and indicates that the phthalonitrile-epoxy adhesive should have a longer service/use life.

In an additional experiment, 10 g of Example 6 and Comparative Example 2 were added to aluminum weigh boats and cured according to the cure schedule listed in Example 5. Thermogravimetric analysis was performed on ~18 mg of the resultant cured adhesive. The samples were exposed to a ramp from room temperature to 950° C. in air at a rate of 10° C./min. The amine component in Example 6 and Comparative Example 2 differ only in their inclusion of a phthalonitrile moiety. The resulting degradation profiles indicate that the adhesive which contains the phthalonitrile moiety (Example 6) demonstrates higher thermo-oxidative stability. This is due to the formation of the phthalonitrile network in addition to the epoxy network formed from the epoxy-amine chemistry. This result demonstrates that a phthalonitrile network can not only form at this low cure time and temperature, but that it is also capable of improving thermo-oxidative stability.

Fillet Formation: Adhesive fillets were evaluated using a Keyence VHX 6000 optical microscope at 100× magnification. Individual fillets from Example 5 and Comparative Example 1 were compared by height, width, and area (Table 2).

TABLE 2

Optical Microscopy Analysis of E5 and CE1 Fillets

| | Fillet Height (μm) | Fillet Width (μm) | Fillet Area ($mm^2$) |
|---|---|---|---|
| Example 5 | 610 | 650 | 0.16 |
| Comparative Example 1 | 358 | 618 | 0.07 |

Fillets are clearly visible in a sample prepared according to Example 5. Furthermore, the fillets formed are larger than those of Comparative Example 1, a commercial adhesive used for honeycomb sandwich panel construction. This is significant as the materials used for honeycomb sandwich panels offer very little area for the adhesive to bond. Thus, any additional contact area created through the formation of fillets will increase this contact area and potentially increase the overall bond strength.

Glass Transition Temperature ($T_g$): Samples (~1"×1" each) of Example 2 and Example 3 were added to individual aluminum weigh boats and cured according to the cure schedule listed in Example 5. A 1"×1" sample of FM309-1 was added to an aluminum weigh boat and cured according to the cure schedule listed in Comparative Example 1. Differential scanning calorimetry (DSC) was performed on each of these samples using a TA Instruments Discovery DSC 250 to assess the glass transition temperature ($T_g$). All testing was performed using approximately 10 mg of sample in hermetically sealed pans. Samples were evaluated using a 10° C./min ramp rate from 40° C. to 400° C. The $T_g$ was determined by the inflection point of the baseline shift.

TABLE 3

$T_g$ of cured adhesives E2, E3, and CE1

| Sample | $T_g$ (° C.) |
|---|---|
| Example 2 | 196 |
| Example 3 | 171 |
| Comparative Example 1 | 174 |

Both Example 2 and Example 3 demonstrate $T_g$'s similar to or higher than that of Comparative Example 1. In the case of Example 2, this adhesive is able to experience higher temperatures prior to softening than the commercially available product, which ultimately indicates an ability to expose the material to a higher use temperature.

In an additional experiment, 10 g of Example 6 and Comparative Example 2 were added to aluminum weigh boats and cured according to the cure schedule listed in Example 5. Differential scanning calorimetry was performed on approximately 10 mg of each sample. The samples were tested in hermetically sealed pans and exposed to a 10° C./min ramp rate from 50° C. to 400° C. The glass transition temperature ($T_g$) was determined by the inflection point of the baseline shift and the results can be seen in Table 4.

TABLE 4

$T_g$ of cured adhesives E6 and CE2

| Sample | Tg (° C.) |
|---|---|
| Example 6 | 129 |
| Comparative Example 2 | 84 |

Both of the adhesives in Table 4 were prepared using a 2:1 ratio of epoxy to amine functionality and only differ in their inclusion of a phthalonitrile moiety. The adhesive containing the phthalonitrile functionality (Example 6) demonstrates a substantial 45° C. Tg increase. This is due to the increased rigidity developed from the formation of the phthalonitrile network in addition to the epoxy network formed from the epoxy-amine chemistry. This result demonstrates that a phthalonitrile network can not only form at this low cure time/temperature, but that it can also increase the Tg allowing for higher use temperatures.

Shear Strength: Shear strength was evaluated using a single-lap-joint method according to ASTM D1002. Aluminum substrates (phosphoric acid anodized and primed using Solvay BR 6747-1) were purchased from Pacific Coast Composites. Example 2 was used as the adhesive and cured according to the heating profile set forth in Example 5. FM309-1 was tested as a commercial-off-the-shelf (COTS) baseline and cured according to the cure profile listed in Comparative Example 1. The results are reported in Table 5. It is important to note Example 2 represents an un-optimized system void of toughening agents, flexibilizers, and fillers commonplace to a commercial adhesive to improve shear strength and toughness.

TABLE 5

Shear strength of E2 and CE1

| Sample | Avg Shear Strength (ksi) |
|---|---|
| Example 2 | 1.79 ± 0.13 |
| Comparative Example 1 | 3.36 ± 0.65 |

Additional Monomers useful in the present disclosure can include the following Table 6, and are either commercially available or noted in literature as indicated.

TABLE 6

Additional amino-phthalonitriles
COMMERCIAL PRODUCTS

| Name | Chemical Structure | Supplier |
|---|---|---|
| 4-(3,4-Diaminobenzoyl)phthalonitrile | 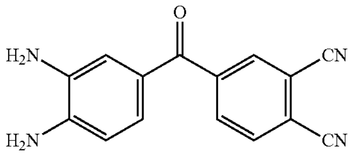 [SMILES: N#Cc1ccc(C(=O)c2ccc(N)c(N)c2)cc1C#N] | AmBeed, A1493612 |
| 4-Aminophthalonitrile | 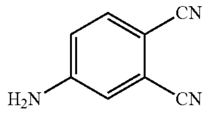 | TCI, A1166 |
| 4,5-Diaminophthalonitrile | 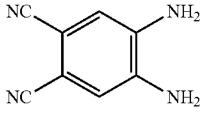 | TCI, D4329 |

LITERATURE EXAMPLES, Compiled from: Augustine, D.; Chandran, M.S.; Mathew, D.; Reghunadhan Nair, C.P., Chapter 18-Polyphthalonitrile resins and their high-end applications. In Thermosets (Second Edition), Guo, Q., Ed. Elsevier: 2018; pp 577-619.

| Name | Chemical Structure | Reference |
|---|---|---|

TABLE 6-continued

| | | |
|---|---|---|
| 4,4'-diamino-4''-(3,4-dicyanophenoxy)triphenylmethane | 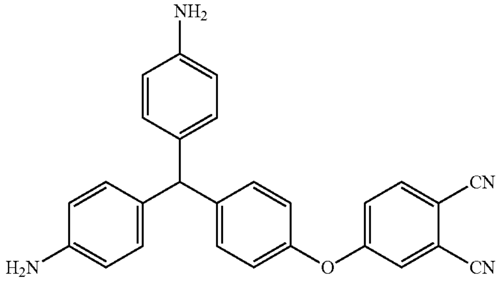 [SMILES: N#Cc1ccc(Oc2ccc(C(c3ccc(N)cc3)c3ccc(N)cc3)cc2)cc1C#N] | Polym. Adv. Technol. 2013, 24, 258-265 |
| Imide-amine phthalonitrile | 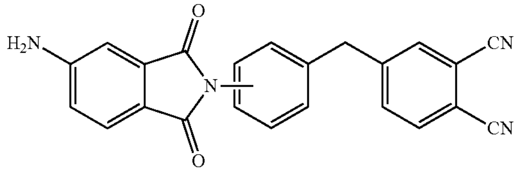 | J. Polym. Sci., Part A: Polym. Chem. 48 (24) (2010) 5916-5920 |
| Ether-amine-phthalonitrile | 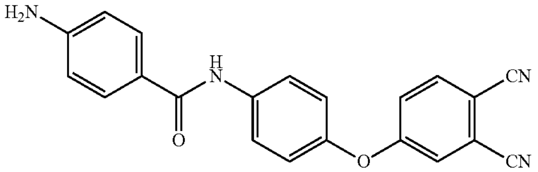 [SMILES: N#Cc1ccc(Oc2ccc(NC(=O)c3ccc(N)cc3)cc2)cc1C#N] | Polym. Chem. 4 (12) (2013) 3617-3622 |
| 4-(4-3,5-diaminobenzoyl)phenoxy)phthalonitrile | 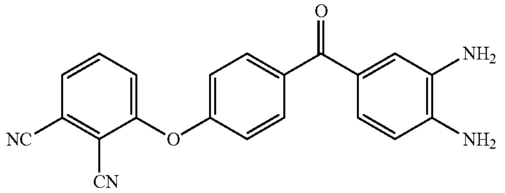 [SMILES: N#Cc1cccc(Oc2ccc(C(=O)c3ccc(N)c(N)c3)cc2)c1C#N] | Polym. Bull. 62 (5) (2009) 581-591 |

The present disclosure provides compositions and methods for the preparation and curing of honeycomb sandwich structures utilizing phthalonitrile-epoxy hybrid adhesives. The effective combination of the well-established manufacturability of epoxy chemistry with the exceptional high temperature stability of phthalonitrile chemistry through combining an epoxy resin and an amino-phthalonitrile monomer, upon curing, provides the hybrid material where the amine moiety covalently bonds to the epoxy while the phthalonitrile groups react with each other to create the rigid co-polymerized thermoset network with superior properties. The final film adhesives are processable under current epoxy adhesive standards (temperatures ≤350° F., cure time ≤3 hours) while providing thermo-oxidative stability beyond that of commercial epoxy materials.

Such materials can support current and future aerospace programs through the development of a higher temperature adhesive which maintains compatibility with current 350° F. cure composites. This adhesive can further serve to replace existing solutions incapable of surviving 10,000 hours at a 270° F. temperature exposure without performance issues. Other potential applications can include propulsion structures, landing gear doors, and the like.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An adhesive formulation, comprising:

an epoxy-functional monomer or epoxy-functional polymer;

an amino-phthalonitrile monomer or amino-phthalonitrile polymer, wherein the amino-phthalonitrile monomer or amino-phthalonitrile polymer contains a single phthalonitrile functional group; and one or more additives.

2. The adhesive formulation of claim 1, wherein the epoxy-functional monomer or epoxy-functional polymer comprises two or more glycidyl functional groups.

3. The adhesive formulation of claim 2, wherein the epoxy-functional monomer or epoxy-functional polymer comprises 4,4'-methylenebis(N,N-diglycidylaniline), bisphenol A diglycidyl ether, bisphenol F diglycidyl ether, N,N-diglycidyl-4-glycidyloxyaniline, 1,4-butanediol diglycidyl ether, trimethylolpropane triglycidyl ether, poly[(phenyl glycidyl ether)-co-dicyclo-pentadiene], or a combination thereof.

4. The adhesive formulation of claim 1, further comprising a difunctional amine monomer.

5. The adhesive formulation of claim 4, wherein the difunctional amine monomer comprises 4,4'-diaminodiphenyl sulfone, 3,3'-diaminodiphenyl sulfone, p-phenylene diamine, 4,4'-diaminobenzophenone, 1,3-cyclohexanebis(methylamine), or a combination thereof.

6. The adhesive formulation of claim 1, wherein the amino-phthalonitrile monomer or amino-phthalonitrile polymer contains at least one primary amine functional group.

7. The adhesive formulation of claim 1, further comprising a solvent comprising dimethyl sulfoxide, N,N-dimethylformamide, 1-methyl-2-pyrrolidinone, 2-phenoxyethanol, acetone, 2-butanone, 2-pentanone, 4-methyl-2-pentanone, n-butyl acetate, toluene, xylene, benzene, or a combination thereof.

8. The adhesive formulation of claim 1, wherein the one or more additives are selected from a group consisting of a filler, a dispersant, a rheology modifier, a catalyst, a cure promoter, a surfactant, a pigment, and any combination thereof.

9. A method of making an epoxy-phthalonitrile copolymer, comprising:

combining an epoxy-functional monomer and an amino-phthalonitrile functional monomer, wherein the amino-phthalonitrile functional monomer contains a single phthalonitrile functional group;

heating the epoxy-functional monomer and the amino-phthalonitrile functional monomer to a first melting temperature to form a solution;

mixing the solution until it is homogenous; and heating the solution at a second temperature to cure the epoxy-phthalonitrile copolymer.

10. The method of making an epoxy-phthalonitrile copolymer of claim 9, wherein the second temperature is less than or equal to 350° F., and the second temperature is sustained for less than or equal to 5 hours.

11. A sandwich panel composition, comprising:

a honeycomb core;

a first facesheet panel affixed to a first outer edge of the honeycomb core;

a second facesheet panel affixed to a second outer edge of the honeycomb core;

a first phthalonitrile-epoxy adhesive layer between the first facesheet panel and the first outer edge of the honeycomb core, wherein the first phthalonitrile-epoxy adhesive layer comprises an amino-phthalonitrile monomer or amino-phthalonitrile polymer containing a single phthalonitrile functional group; and a second phthalonitrile-epoxy adhesive layer between the second facesheet panel and the second outer edge of the honeycomb core, wherein the second phthalonitrile-epoxy adhesive layer comprises an amino-phthalonitrile monomer or amino-phthalonitrile polymer containing a single phthalonitrile functional group.

12. The sandwich panel composition of claim 11, wherein the first facesheet or the second facesheet comprises a polymer matrix.

13. The sandwich panel composition of claim 12, wherein the polymer matrix comprises a material selected from the group consisting of epoxy, polyaramid, phenolic, bismaleimide, polyimide, phthalonitrile, polyether ether ketone (PEEK), polyetherketoneketone (PEKK), polyester, benzoxazine, and a combination thereof.

14. The sandwich panel composition of claim 11, wherein the first facesheet or the second facesheet comprises a metal or metal alloy.

15. The sandwich panel composition of claim 14, wherein the first facesheet or the second facesheet comprises aluminum, titanium, stainless steel, or a combination thereof.

16. The sandwich panel composition of claim 11, wherein the honeycomb core comprises an electrically conductive material.

17. The sandwich panel composition of claim 11, wherein the honeycomb core comprises a metal, or a polymer matrix.

18. The sandwich panel composition of claim 11, wherein the honeycomb core comprises a material selected from the group consisting of aluminum, titanium, stainless steel, aramid, polyaramid, and any combination thereof.

19. The sandwich panel composition of claim 11, wherein the sandwich panel is a component of an aerospace structural application.

20. The sandwich panel composition of claim 19, wherein the sandwich panel is a component of a nacelle.

* * * * *